Figure 1:
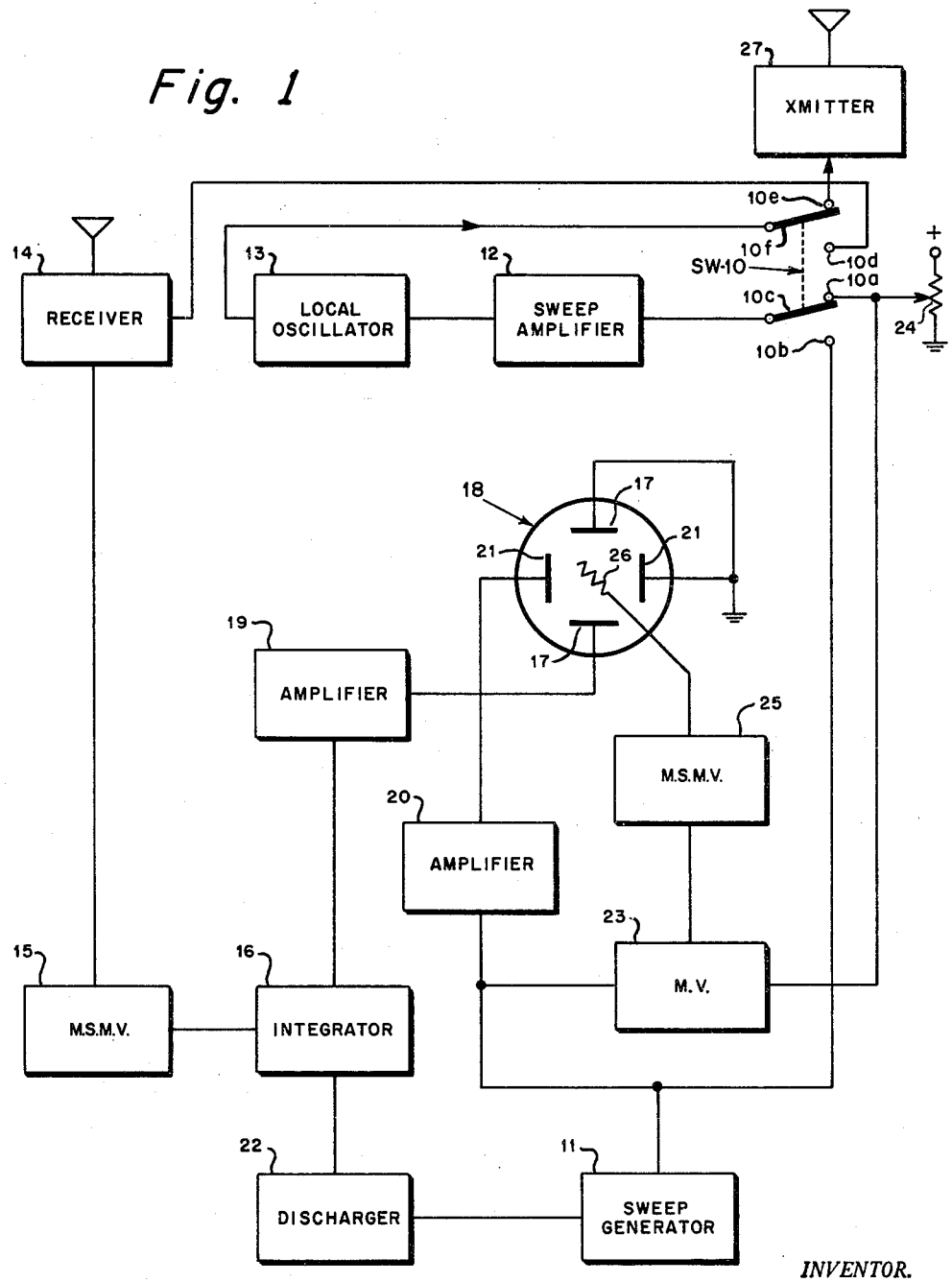

INVENTOR.
EDWARD BUYER
ROBERT H. EDMONDS
JESSE R. KARP

ATTORNEY

United States Patent Office 3,160,883
Patented Dec. 8, 1964

3,160,883
RADAR SIGNAL DENSITY ANALYSIS CIRCUIT
Edward Bayer, Ramsey, N.J., and Robert H. Edmonds, New York, and Jesse R. Karp, New Rochelle, N.Y., assignors, by mesne assignments, to the United States of America as represented by the Secretary of the Navy
Filed Sept. 29, 1961, Ser. No. 141,918
6 Claims. (Cl. 343—18)

The present invention relates to a density analysis circuit and more particularly to a system for displaying radar signal density as a function of frequency over a wide band.

In the field of military countermeasures, the determination of effective techniques for counteracting enemy search radar has been of continual concern to the military. Particularly in the case where an enemy is using a large number of radar frequencies for discovering and locating our forces, the efficient use of limited jamming facilities for counteracting enemy radars has long been of concern. For example, if one of our aircraft or ships carrying limited jamming facilities is in an area where an enemy is constantly and with a large number of search radar units endeavoring to locate the aircraft or ship, it is of great importance to be able to accurately determine the optimum area within a particular bandwidth where a single jamming equipment may be used most effectively and efficiently.

This invention deals with the problem of efficient and effective use of limited facilities for jamming enemy search radar, and contemplates a system for displaying radar signal density as a function of frequency over a wide band. With the present invention it is possible to determine that point or area in a wide band of frequencies at which enemy radar signals are most dense. Thus, the system of the present invention makes it possible to determine the optimum band of operation for barrage jamming of enemy radar by which the greatest number of enemy radar may be counteracted with a single barrage jamming equipment.

The present invention utilizes a panoramic superheterodyne receiver employing a swept local oscillator for monitoring a wide band of frequencies. As the panoramic receiver sweeps through the band, a single pulse from each of the various frequencies in the band at which an enemy is operating radar is selected, limited, stretched, and integrated and applied to the vertical deflection plates of a horizontally swept cathode ray tube. The cathode ray tube then displays a signal which has an amplitude proportional to the radar pulse density.

The present invention further has means for visually marking the point on the signal display of the cathode ray screen representative of the area in the bandwidth where enemy radar signals are most dense. This invention has the additional feature of stopping the sweep of the local oscillator of the panoramic receiver at the central frequency of the above-mentioned area in the bandwidth. This central frequency so selected is made available to a jamming transmitter as the reference frequency of the transmitter.

Therefore, it is an object of the present invention to provide a system for displaying radar signal density as a function of frequency over a wide band.

Another object of the present invention is to provide a system for determining within a bandwidth the most active area of radar frequencies used by an enemy.

A further object of the invention is to provide a radar signal density display system for determining the optimum frequency at which jamming equipment should be operated in countermeasures systems.

Still another object of the invention is to provide a display for radar signal density as a function of frequency over a wide band and which has means for utilizing in a jamming transmitter the frequency determined to be in the center of the area in which enemy radar signals are most dense.

Figure 2:
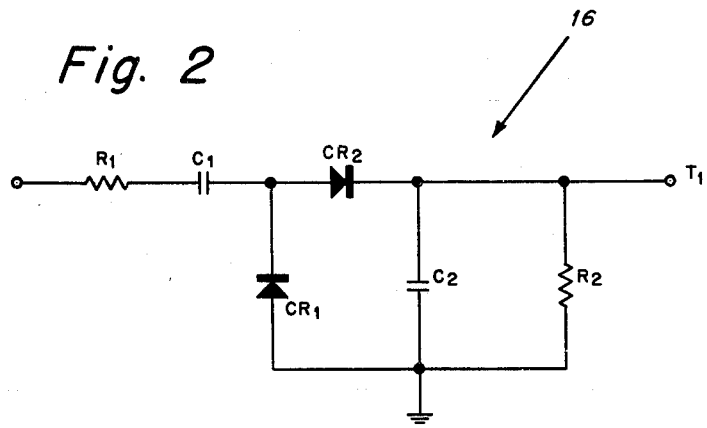
Figure 3:
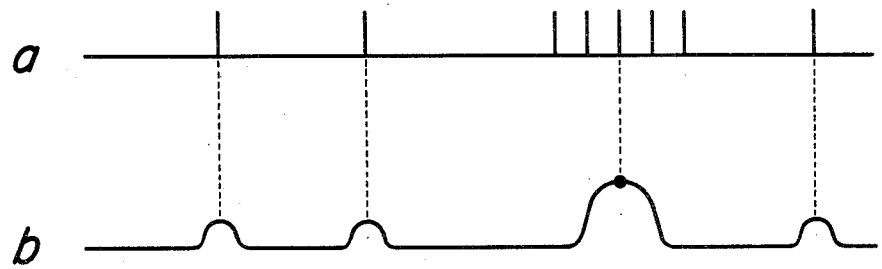

With these and other objects in view as will hereinafter more fully appear and which will be more particularly pointed out in the appended claims, reference is now made to the following description taken in connection with the accompanying drawings in which:

FIG. 1 shows in block diagram form the density analysis system of this invention;
FIG. 2 is a schematic of the integrator of FIG. 1; and
FIGS. 3a and 3b illustrate the waveforms at the superheterodyne receiver output stage and at the display stage.

Referring now to FIG. 1, there is shown a sweep generator 11 which provides a recurring sawtooth sweep voltage output. The sweep generator 11 is normally connected through switch arm 10c to amplifier 12 which amplifies the sweep voltage which is then fed as an input to local oscillator 13 to drive the local oscillator 13 through a predetermined band of frequencies. The local oscillator 13 along with superheterodyne receiver 14 forms a panoramic receiver which monitors the frequency spectrum through which local oscillator 13 is swept. The local oscillator 13, therefore, supplies a varying tuning frequency to superheterodyne receiver 14 which has a bandwidth determined in part by the sweeping rate of sweep generator 11. Superheterodyne receiver 14 has a pulse output for each radar unit that happens to be operating within the band of frequencies through which local oscillator 13 is recurrently swept. The output of superheterodyne receiver 14 is fed as an input into monostable multivibrator pulse stretcher 15. The pulse stretcher 15 being monostable provides a single stretched pulse per radar frequency as an output. Pulse stretcher 15 is connected to integrator 16 in which the output pulses of pulse stretcher 15 are integrated to provide an output voltage having an amplitude proportional to radar signal density. The output of integrator 16 is then applied to the vertical deflection plates 17 of a cathode ray tube 18 through amplifier 19. The sawtooth sweep voltage from sweep generator 11 is also supplied to the horizontal deflection plates 21 of cathode ray tube 18 through amplifier 20.

Cathode ray tube 18 may be of a conventional design and with the above-mentioned inputs supplied to the vertical deflection plates 17 and the horizontal deflection plates 21 displays radar signal density as a function of frequency throughout the frequency band through which local oscillator 13 is swept. On each retrace of sweep generator 11, discharger 22 resets integrator 16 for the next sweep. Since sweep generator 11 initiates the inputs to each set of deflection plates of cathode ray tube 18, the display on cathode ray tube 18 is always synchronized.

Referring to FIG. 2, there is shown integrator 16 in schematic form. The integrator 16 provides equal voltage steps at each pulse from the pulse stretcher 15 which results in a voltage output having an amplitude proportional to the total number of input pulses. The output pulses from pulse stretcher 15 charge capacitor C1 through isolation resistor R1. The charge on C1 is transferred to and stored on capacitor C2. Resistor R2 leaks the charge from capacitor C2 and provides pulse recovery. Diode CR1 acts as a clamp while diode CR2 acts as a switch. The time constant of capacitor C2 and resistance R2 is selected to provide an output proportional to radar density which is cumulative only when the individual radars operating within the bandwidth are not separated in frequency beyond a predetermined amount. Thus, when the output of integrator 16 is applied to the vertical deflection plates of cathode ray tube 18, the part of the display on the face of the tube having the greatest amplitude gives the frequency around which the most radar units are operating. As seen in FIG. 3b, this information is easily discernible. FIG. 3a illustrates the frequencies at which enemy radar units are operating within the bandwidth and which have the same relative position within the bandwidth as the displayed radar density packets of FIG. 3a.

Sweep generator 11 also has the sawtooth voltage output thereof connected as an input to multivibrator 23 which has a second input obtained from potentiometer 24. Potentiometer 24 provides a reference voltage to multivibrator 23 which may be varied by manually adjusting the arm of potentiometer 24. Thus, when the sawtooth voltage of sweep generator 11 passes through a voltage value equal to the value of the reference voltage from potentiometer 24, multivibrator 23 provides an output pulse to monostable multivibrator 25. Monostable multivibrator 25 then pulses the intensifier grid 26 to provide a marker on the face of the cathode ray tube screen. By observing the screen of the cathode ray tube 18 and by manually adjusting the potentiometer arm to vary the reference voltage input to multivibrator 23 the marker may be made to appear at the peak of the largest curve on the display which is indicative of the frequency about which radar signals are most dense. The exact point of the marker is at the peak of the curve on graph B and is indicative of a central frequency about which the individual radar frequencies cluster more densely than at any other frequency within the bandwidth. This particular central frequency then is the one used with barrage jamming equipment to negate or counteract as many individual radar frequencies as is possible with a single narrow band jamming transmitter.

The manner in which this central frequency is determined and put in use by a jamming transmitter will now be discussed. After that point in the bandwidth indicative of the central frequency about which enemy radar signals are most dense has been marked by varying manually adjustable potentiometer 24, ganged switch 10 is operated to the position shown. On operation of switch 10, the local oscillator 13 is disconnected from sweep generator 11 and held at the central frequency by virtue of being connected to the reference voltage of potentiometer 24. Switch arm 10C makes contact with the arm of potentiometer 24 at the same time switch arm 10F is connected to transmitter 27 via contact 10e which disconnects superheterodyne receiver 14 from local oscillator 13. Transmitter 26 using the now fixed frequency of the local oscillator 13, which is the central frequency, transmits a jamming frequency which counteracts the radar units transmitting at or around the central frequency. Thus, the present invention acts not only as a display of radar signal density as a function of frequency over any selected band but also provides through a simple manual adjustment that frequency in the bandwidth around which enemy radar signals are most dense. By a simple switching operation this central frequency is selected by stopping the sweeping of local oscillator 13 so that it oscillates at the central frequency. The central frequency then serves as the reference frequency for the optimum band of operation for barrage jamming by the transmitter 27.

The sweep rate of the local oscillator 13 and the bandwidth swept may of course be chosen to suit the particular situation. However, for ease of understanding in this case, it was assumed that the local oscillator sweep rate is one cycle per second while the actual bandwidth to be swept is $3 \times 10^9$. The actual spectrum in a band of frequencies to be swept is also selectable according to the particular situation. Once the intermediate frequency, bandwidth, minimum pulse repetition frequency of each radar signal, and bandwidth to be swept is selected, the local oscillator sweep rate is then determined by the equation $$FL \cdot O \cdot = \frac{F_O \times F_R}{F_B}$$

where $FL \cdot O \cdot$ = local oscillator sweep rate
$F_O$ = I.F. frequency bandwidth
$F_R$ = minimum pulse repetition frequency,
$F_B$ = bandwidth to be swept.

Also the parameters of the pulse stretcher 15 are such as to provide a stretched output pulse which has a duration of $1/Fr$ where $Fr$ is assumed to be the minimum pulse repetition frequency for the individual radar signals within the bandwidth.

Obviously many modifications and variations of the present invention are possible in the light of the above disclosure. It is therefore to be understood that within the scope of the appended claims the invention may be practiced otherwise than as specifically described.

What is claimed is:

1. A system for displaying radar signal density as a function of frequency over a predetermined bandwidth, comprising in combination: a cathode ray tube, a local oscillator, a sweep generator, means connecting said sweep generator to said local oscillator to vary the frequency of said local oscillator throughout a predetermined bandwidth and to the horizontal deflection plates of said cathode ray tube, a superheterodyne receiver connected to said local oscillator whereby said superheterodyne receiver is continuously tuned to receive various frequencies within said predetermined bandwidth, said superheterodyne receiver having input means coupled to a receiving antenna to receive radar signal frequencies within said predetermined bandwidth and having output means providing said radar signal frequencies within said bandwidth as an output, pulse stretcher means connected to said output means providing a single stretched pulse for each of said radar signal frequencies as an output, integrator means connected said said pulse stretcher means providing a voltage input to the vertical deflection plates of said cathode ray tube having an amplitude proportional to radar signal density, means connected between said sweep generator and said cathode ray tube for applying a pulse to the intensifier grid of said cathode ray tube at a selected point within said predetermined bandwidth whereby a point on the screen of said cathode ray tube which displays radar signal density as a function of frequency over the bandwidth monitored by said superheterodyne receiver may be marked.

2. A system for determining the optimum frequency within a bandwidth for use as the central frequency of operation in radar countermeasure jamming equipment, comprising in combination: a cathode ray tube, a local oscillator, a sweep generator, means connecting said sweep generator to said local oscillator to vary the frequency of said local oscillator throughout a predetermined bandwidth and to the horizontal deflection plates of said cathode ray tube, a superheterodyne receiver connected to said local oscillator, reference voltage means, multivibrator means connected to said sweep generator, said reference voltage means providing the intensifier grid of said cathode ray tube with a pulse when the sweep voltage of said sweep generator equals the reference voltage of said reference voltage means, switch means for disconnecting said local oscillator from said sweep generator and to said reference voltage means to maintain the frequency of said local oscillator at a frequency determined by said reference voltage, jamming transmitter means, said switch means operative to disconnect said local oscillator from said superheterodyne receiver and to connect said local oscillator to said jamming transmitter means whereby said jamming transmitter means operates on a frequency determined by said reference voltage.

3. A system for displaying radar signal density as a function of frequency over a predetermined bandwidth, comprising in combination: a sweep generator, a superheterodyne receiver, a local oscillator for tuning said superheterodyne receiver, first means connecting said sweep generator to said local oscillator for varying the frequency thereof through a predetermined bandwidth, said superheterodyne receiver providing an output for each radar signal within said bandwidth, a cathode ray tube, means connecting said sweep generator to the horizontal deflection plates of said cathode ray tube, multivibrator means having output means connected to the intensifier grid of said cathode ray tube, manually adjustable potentiometer means providing a reference voltage input to said multivibrator means, means connecting said sweep circuit to said multivibrator means for providing an output pulse on said output means when the sweep voltage of said sweep generator equals said reference voltage, monostable multivibrator means connected to said superheterodyne receiver for stretching and limiting to one pulse per radar unit, each of said radar signals, integrator means connected to said monostable multivibrator providing an input to the vertical deflection plates of said cathode ray tube proportional to radar signal density, discharge means connected between said integrator and said sweep generator for discharging said integrator during the retrace period of said sweep generator whereby the screen of said cathode ray tube continually displays radar signal density as a function of frequency and which may be visually marked at any point over said predetermined bandwidth.

4. A system for determining the optimum frequency within a bandwidth for use as the central frequency of operation in radar countermeasure jamming equipment, comprising in combination: a sweep generator, a superheterodyne receiver, a local oscillator for tuning said superheterodyne receiver, first means connecting and sweep generator to said local oscillator for varying the frequency thereof through a predetermined bandwidth, said superheterodyne receiver providing an output for each radar signal within said bandwidth, a cathode ray tube, means connecting said sweep generator to the horizontal deflection plates of said cathode ray tube, multivibrator means having output means connected to the intensifier grid of said cathode ray tube, manually adjustable potentiometer means providing a reference voltage input to said multivibrator means, means connecting said sweep circuit to said multivibrator means for providing an output pulse on said output means when the sweep voltage of said sweep generator equals said reference voltage, monostable multivibrator means connected to said superheterodyne receiver for stretching and limiting to one pulse per radar unit, each of said radar signals, integrator means connected to said monostable multivibrator providing an input to the vertical deflection plates of said cathode ray tube proportional to radar signal density, discharge means connected between said integrator and said sweep generator for discharging said integrator during the retrace period of said sweep generator, first switch means for selectively disconnecting said sweep generator from said local oscillator and said potentiometer to said local oscillator to maintain said local oscillator at a frequency determined by said reference voltage, jamming transmitter means, second switch means for disconnecting said local oscillator from said superheterodyne receiver and to said jamming transmitter means, second means connecting said first and switch means for the ganged operation thereof whereby said local oscillator provides said jamming transmitter with a frequency of operation determined by said reference voltage.

5. A system according to claim 3 wherein said integrator includes, a first circuit comprising, an input terminal, an integrating capacitor, diode means, and an output terminal connected in series, a second circuit comprising, a storage capacitor and a leakage resistor connected in parallel, means connecting said output terminal to ground through said storage capacitor and said leakage resistor, voltage limiting means connected at one end to ground and at the other end between said integrating capacitor and said diode means.

6. A system according to claim 4 wherein said integrator includes, a first circuit comprising, an input terminal, an integrating capacitor, diode means, and an output terminal connected in series, a second circuit comprising, a storage capacitor and a leakage resistor connected in parallel, means connecting said output terminal to ground through said storage capacitor and said leakage resistor, voltage limiting means connected at one end to ground and at the other end between said integrating capacitor and said diode means.

References Cited by the Examiner
UNITED STATES PATENTS

| | | | |
|---|---|---|---|
| 2,481,517 | 9/49 | Jaggi | 325—333 |
| 2,619,590 | 11/52 | Williams | 325—337 |
| 2,658,994 | 11/53 | Huggins et al. | 325—332 |
| 2,950,386 | 8/60 | Jaffe | 325—337 |
| 3,020,402 | 2/62 | Brodsky et al. | 325—332 |

CHESTER L. JUSTUS, *Primary Examiner.*